(12) United States Patent
Yada

(10) Patent No.: US 12,377,494 B2
(45) Date of Patent: Aug. 5, 2025

(54) WATER JET LASER PROCESSING MACHINE

(71) Applicant: MAKINO MILLING MACHINE CO., LTD., Tokyo (JP)

(72) Inventor: Kenichi Yada, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 647 days.

(21) Appl. No.: 17/763,383

(22) PCT Filed: Sep. 25, 2020

(86) PCT No.: PCT/JP2020/036440
§ 371 (c)(1),
(2) Date: Mar. 24, 2022

(87) PCT Pub. No.: WO2021/060535
PCT Pub. Date: Apr. 1, 2021

(65) Prior Publication Data
US 2022/0362884 A1 Nov. 17, 2022

(30) Foreign Application Priority Data
Sep. 25, 2019 (JP) .................................. 2019-174661

(51) Int. Cl.
*B23K 26/146* (2014.01)
(52) U.S. Cl.
CPC .................... *B23K 26/146* (2015.10)

(58) Field of Classification Search
CPC ................ B23K 26/146; B23K 26/032; B23K 26/0853; B23K 26/1438; B23K 26/1476;
(Continued)

(56) References Cited

U.S. PATENT DOCUMENTS

| 6,175,580 B1 | 1/2001 | Odaka et al. |
| 2006/0133752 A1 | 6/2006 | Zhang |

(Continued)

FOREIGN PATENT DOCUMENTS

| CN | 103223386 A | 7/2013 |
| JP | 2013-215769 A | 10/2013 |
| JP | 2013-215787 A | 10/2013 |

OTHER PUBLICATIONS

International Search Report for PCT/JP220/036440 (Nov. 10, 2020).

*Primary Examiner* — Chris Q Liu
(74) *Attorney, Agent, or Firm* — Merchant & Gould P.C.

(57) ABSTRACT

A water jet laser processing machine (100) is provided with a nozzle (26) that can eject a water column (34) and introduce a laser beam into the water column (34), a pump (40) that supplies pressurized water to the nozzle (26), a pressure sensor (42) that detects the pressure of the water supplied from the pump (40) to the nozzle (26), a storage unit (52) that stores a threshold value for assessing a decrease in the pressure of the water supplied from the pump (40) to the nozzle (26), and a determination unit (51) that, on the basis of the pressure detected by the pressure sensor (42) and the threshold value stored by the storage unit (52), determines whether the pressure detected by the pressure sensor (42) has decreased, thereby determining whether the nozzle (26) has damage.

2 Claims, 2 Drawing Sheets

(58) Field of Classification Search
CPC .............. B23K 26/38; B23K 26/702; B23K
2103/50; B23K 26/0096; B23K 26/02;
B23K 26/04; B23K 26/042; B23K
26/046; B23K 26/064; B23K 26/0643;
B23K 26/082; B23K 26/1224; B23K
26/147; B23K 26/21; B23K 26/364;
B23K 26/40; B23K 26/703; B23K 26/705
USPC ... 219/121.6, 121.63, 121.67, 121.68, 121.7,
219/121.75, 121.84
See application file for complete search history.

(56) References Cited

U.S. PATENT DOCUMENTS

| | | | |
|---|---|---|---|
| 2014/0336828 A1 | 11/2014 | Gromes, Sr. et al. | |
| 2017/0157709 A1* | 6/2017 | Richerzhagen | B05B 12/082 |
| 2017/0361399 A1* | 12/2017 | Toyama | B23K 26/032 |
| 2018/0029159 A1* | 2/2018 | Toyama | B23K 26/042 |
| 2018/0161930 A1* | 6/2018 | Warashina | B23K 26/702 |
| 2018/0281109 A1* | 10/2018 | Onodera | B23K 26/705 |
| 2018/0290255 A1* | 10/2018 | Yada | B23Q 17/0952 |

* cited by examiner

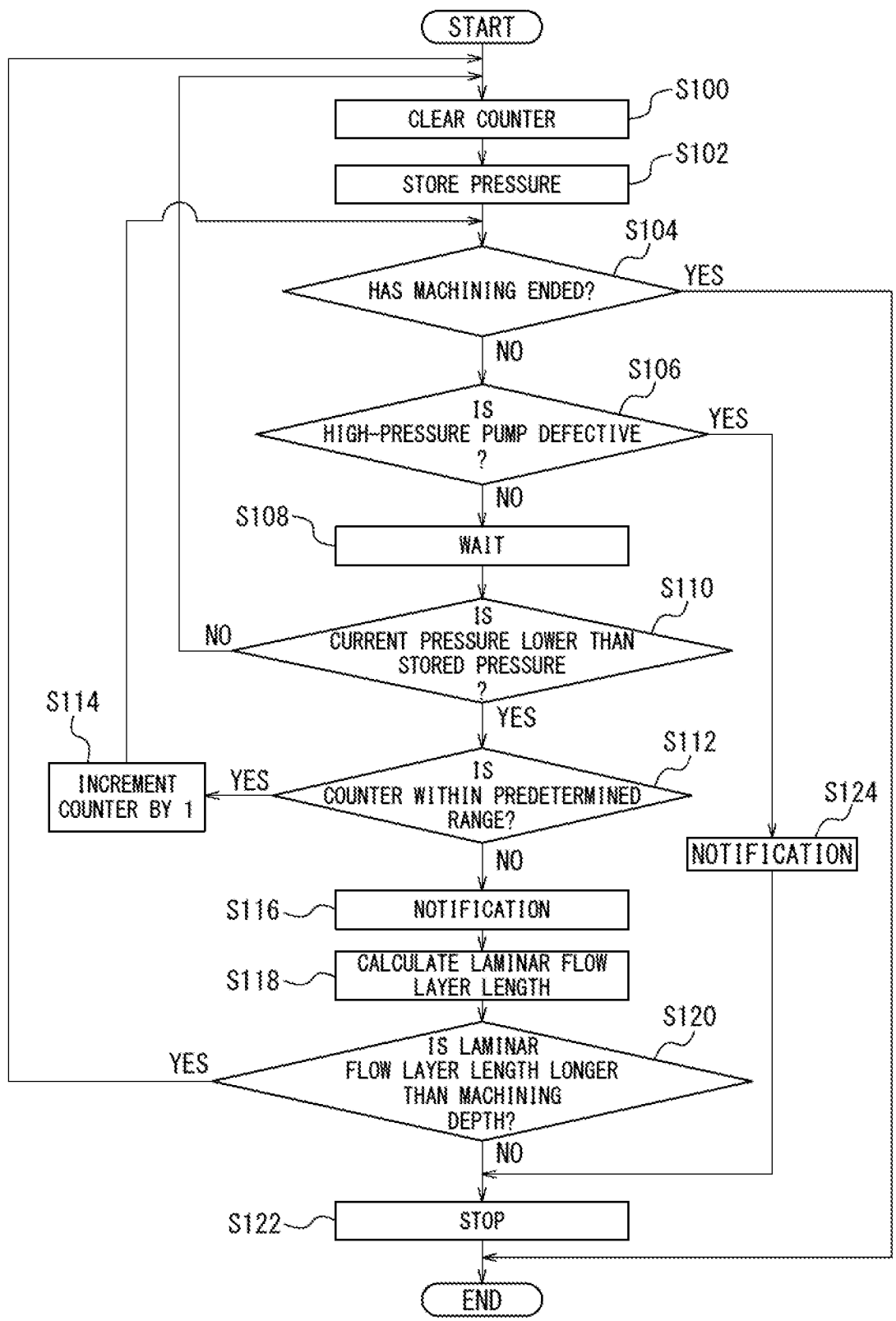

WATER JET LASER PROCESSING MACHINE

This application is a National Stage Application of PCT/JP2020/036440 filed Sep. 25, 2020, which claims benefit of priority to Japanese Patent Application No. 2019-174661, filed Sep. 25, 2019, which applications are incorporated herein by reference. To the extent appropriate, a claim of priority is made to each of the above disclosed applications.

FIELD

The present invention relates to a water jet laser processing machine.

BACKGROUND

Water jet laser processing machines which machine a workpiece by irradiating the workpiece with a laser guided by a water column are conventionally known. In such a water jet laser processing machine, if the nozzle which sprays the water column is damaged, the water column may not be formed properly. In this case, the laser cannot be guided as intended, and thus, the workpiece may not be machined properly.

In association with the problem as described above, for example, Patent Literature 1 discloses a laser machining device comprising detection means for detecting liquid column abnormalities. This laser machining device comprises a pipe for passing a liquid column which guides a laser beam. The pipe is further configured to allow gas to flow around the liquid column to rectify the liquid column. The detection means has various sensors (for example, a flow rate sensor, an acoustic sensor, and a pressure sensor) for detecting abnormalities in the gas described above. These sensors are provided in the flow path around the nozzle for guiding the gas to the pipe. In this laser machining device, gas anomalies detected by these sensors are recognized as liquid column anomalies.

CITATION LIST

Patent Literature

[PTL 1] Japanese Unexamined Patent Publication (Kokai) No. 2013-215769

SUMMARY

Technical Problem

In the laser machining device of Patent Literature 1, the various sensors are provided around the nozzle as described above, and thus, additional components, including wires therefor, are required, which can complicate the design around the nozzle. The present disclosure aims to provide a water jet laser processing machine which can detect damage of the nozzle with a simpler structure.

Solution to Problem

One aspect of the present disclosure provides a water jet laser processing machine which guides a laser beam with a water column and which machines a workpiece by irradiating the workpiece with the laser beam, the processing machine comprising a nozzle for spraying the water column, the nozzle being configured so as to be capable of introducing the laser beam into the water column, a pump for supplying pressurized water to the nozzle, a pressure sensor for detecting pressure of water supplied from the pump to the nozzle, a storage unit configured to store a threshold for determining a decline in the pressure of the water supplied from the pump to the nozzle, and a determination unit configured to determine whether or not the pressure detected by the pressure sensor has declined based on the pressure detected by the pressure sensor and the threshold stored in the storage unit, to thereby determine whether or not the nozzle has damage.

As a result of rigorous investigation, the present inventors have discovered that when damage (for example, cracking) occurs in the nozzle, the pressure of the water supplied from the pump to the nozzle declines. Thus, by arranging a pressure sensor between the pump and the nozzle so as to detect the pressure of the water, a decline in the pressure of the water supplied from the pump to the nozzle, and specifically, damage of the nozzle, can be detected. Therefore, it can be determined whether or not the nozzle has damage with a simple structure representing by providing a pressure sensor between the pump and the nozzle.

A relationship between the pressure of the water supplied from the pump to the nozzle and a length of a laminar flow layer of the water column may further be stored in the storage unit, and when it is determined that the nozzle has damage, the determination unit may determine whether or not the workpiece can be machined by calculating the length of the laminar flow layer based on the pressure detected by the pressure sensor and the relationship stored in the storage unit, and determining whether or not the length of the laminar flow layer is greater than an intended machining depth. The present inventors have further discovered that there is a correlation between the pressure of the water supplied from the pump to the nozzle and the length of the laminar flow layer of the water column. Thus, according to this aspect, even if the nozzle has damage, by detecting the length of the laminar flow layer, it can be determined whether or not the workpiece can be machined using the damaged nozzle. Thus, the usage period of the nozzle can be extended.

The pressure detected by the pressure sensor at a certain time point may be stored in the storage unit as the threshold, and the determination unit may determine that the pressure detected by the pressure sensor has declined when the pressure detected by the pressure sensor after the certain time point falls below the threshold for a predetermined time or longer. According to this aspect, even if the pressure detected by the pressure sensor fluctuates slightly, the decline in pressure can accurately be detected, and thus, it can more accurately be determined whether or not the nozzle has damage.

Advantageous Effects of Invention

According to the aspect of the present disclosure, there can be provided a water jet laser processing machine which can detect damage of the nozzle with a simple structure.

BRIEF DESCRIPTION OF DRAWINGS

FIG. 2 is a flowchart showing the operation of the water jet laser processing machine of FIG. 1.

DESCRIPTION OF EMBODIMENTS

Figure 1:
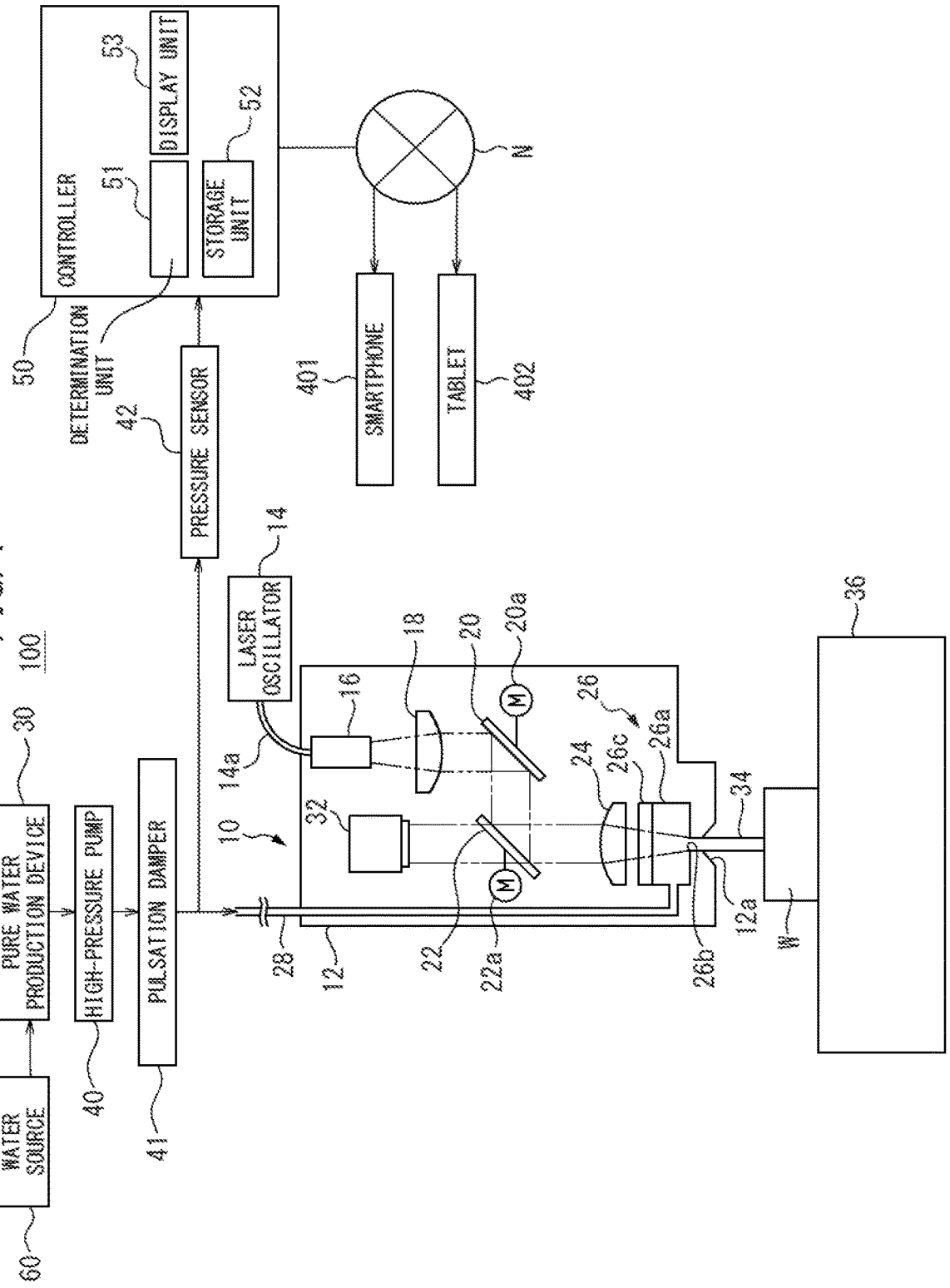
FIG. 1 is a schematic view showing a water jet laser processing machine according to an embodiment.

A fluid supply device and water jet laser processing machine according to an embodiment will be described below with reference to the attached drawings. Identical or corresponding elements have been assigned the same reference signs, and duplicate descriptions thereof have been omitted. To facilitate understanding, the scales of the drawings have been modified in some cases.

FIG. 1 is a schematic view showing a water jet laser processing machine 100 according to an embodiment. The water jet laser processing machine (also referred to below simply as "laser processing machine") 100 guides a laser beam with a water column 34 and machines a workpiece W by irradiating the workpiece W with the laser beam. The laser processing machine 100 comprises, for example, a laser head 10, a pure water production device 30, a high-pressure pump 40, a pulsation damper 41, a pressure sensor 42, a workpiece table 36, and a controller 50. The laser processing machine 100 may further comprise other constituent elements.

The laser head 10 irradiates the workpiece W with the laser beam. For example, the laser head 10 is linearly movable in each of the three orthogonal axial directions (X, Y, and Z directions) relative to the workpiece table 36. The driving of the laser head 10 may be controlled by an NC device incorporated in the controller 50. In the laser head 10, the laser beam is emitted from a laser transmitter 14 arranged outside (or inside) a housing 12. For example, the laser transmitter 14 emits a visible light laser (for example, Nd:YAG laser). The laser beam is received by a laser irradiation head 16 via a light guide member 14a such as an optical fiber. The laser irradiation head 16 emits the laser beam toward a collimation lens 18. The laser beam from the laser irradiation head 16 is converted into parallel rays by the collimation lens 18, is reflected by a first mirror 20 toward a second mirror 22, and is reflected by the second mirror 22 toward a laser focusing lens 24. The laser beam focused by the laser focusing lens 24 is emitted to the outside of the housing 12 through a nozzle hole 26b of a nozzle 26.

The first and second mirrors 20, 22 have planar reflecting surfaces, and have a first motor 20a and a second motor 22a, respectively, as mirror orientation changing means. By adjusting the orientation of the reflecting surfaces with the first motor 20a and the second motor 22a, the focal position of the laser beam can be adjusted in two horizontal directions (X direction and Y direction). For example, the first and second mirrors 20, 22, and in particular the second mirror 22, which reflects the laser beam toward the laser focus lens 24, may include a dielectric multilayer film. The dielectric multilayer film is adapted to the wavelength of the laser beam irradiated from the laser transmitter 14, reflects the laser beam, and allows light having a wavelength other than the wavelength of the laser beam to pass therethrough. Such a dielectric multilayer film is formed on a glass plate by, for example, vapor deposition. When the second mirror 22 includes a dielectric multilayer film, the positional relationship between the laser beam irradiated from the nozzle hole 26b and the nozzle hole 26b can be monitored by a camera 32. For example, the focus of the camera 32 is aligned with the surface of the nozzle head 26a on the same level as the opening surface of the nozzle hole 26b. The operation of the constituent elements of the laser head 10 (for example, the laser transmitter 14, the first motor 20a, the second motor 22a, the camera 32, etc.) can be controlled by, for example, a machine controller incorporated in the controller 50.

The nozzle 26 sprays the water column 34 and emits the laser beam into the water column 34. Specifically, the nozzle 26 has a nozzle head 26a. The nozzle head 26a is a hollow member which receives water from the high-pressure pump 40 via piping 28. A window 26c formed from a transparent member such as glass is provided on the upper surface of the nozzle head 26a facing the laser focusing lens 24. The nozzle head 26a is provided with a nozzle hole 26b. A nozzle body (not illustrated) separate from the nozzle head 26a may be detachably attached to the nozzle head 26a, and the nozzle hole 26b may be provided in the nozzle body. In this case, one nozzle body can be selected from a plurality of nozzle bodies having nozzle holes 26b with different inner diameters in accordance with the conditions of the machining. With such a configuration, the inner diameter of the nozzle 26 can be changed. The pressure of the water column 34 varies depending on the flow rate of the water and the inner diameter of the nozzle hole 26b. For example, when the flow rate of water is 20 ml/min to 150 ml/min and the inner diameter of the nozzle hole 26b is 30 μm to 135 μm, the pressure of the water column 34 is approximately 50 MPa (500 bar) to 5 MPa (50 bar). The laser beam emitted from the nozzle hole 26b to the outside of the housing 12 is surrounded by the water column 34 and travels via total internal reflection at the interface between the water column 34 and the surrounding air. Thus, the laser beam travels along the water column 34.

The pure water production device 30 produces water used to form the water column 34 (for example, pure water or ultrapure water, which has fewer impurities than pure water). The pure water production device 30 is fluidly connected to a water source 60 (for example, a tap) and may include components such as a tank, pump, and filter.

The high-pressure pump 40 pressurizes the water supplied from the pure water production device 30, and supplies the pressurized water to the nozzle 26 via the pulsation damper 41 and the piping 28. The high-pressure pump 40 can be, for example, an air driven diaphragm pump. In other embodiments, the high-pressure pump 40 may be another type of volumetric pump (for example, rotary or reciprocating).

The pulsation damper 41 is configured to remove pulsations of the pressurized water discharged from the high-pressure pump 40. Pulsations in the pressurized water can affect machining quality. Thus, the pulsations are removed from the pressurized water before the pressurized water is supplied to the nozzle 26. When the high-pressure pump 40 is a type of pump that does not generate pulsations, the pulsation damper 41 may be omitted.

The pressure sensor 42 is configured so as to detect the pressure of the water supplied from the high-pressure pump 40 to the nozzle 26. For example, the pressure sensor 42 can be connected to the flow path between the high-pressure pump 40 and the nozzle 26 (in the present embodiment, between the pulsation damper 41 and the nozzle 26). The pressure sensor 42 is capable of communicating wired or wirelessly with the controller 50, and is configured so as to transmit the detected pressure to the controller 50.

The workpiece table 36 is arranged, for example, on a bed (not illustrated), and supports the workpiece W. The workpiece table 36 may have a feed device such as a rotary mechanism (not illustrated). The operation of the workpiece table 36 may be controlled by, for example, an NC device incorporated in the controller 50.

The controller 50 is wired or wirelessly connected to the various constituent elements of the laser processing machine 100, and is configured so as to control these constituent elements. The controller 50 can be, for example, a computer, a server, a tablet, etc. The controller 50 has, for example, a determination unit 51, a storage unit 52, and a display unit 53. The controller 50 can have other constituent elements (for example, ROM (read-only memory), and/or an input device (for example, a mouse and keyboard, and/or a touch panel), etc.). The constituent elements of the controller 50 can be connected to each other via busses (not illustrated) or the like.

The determination unit 51 can be realized, for example, by a program stored in the storage unit 52, and the processing of the determination unit 51 can be executed by a processor such as, for example, a CPU (central processing unit). The determination unit 51 is configured so as to determine whether or not the nozzle 26 has damage based on a reduction in pressure detected by the pressure sensor 42.

Specifically, damage can occur in the nozzle 26 due to various causes (for example, collision of debris with the nozzle, irradiation of the nozzle by the laser beam due to misalignment of the laser beam, and/or prolonged pressure on the nozzle by the high-pressure water sent from the pump). Typically, due to the above causes, minute cracks may occur around the nozzle hole 26b. The present inventors have discovered that as the size of such cracks increases and/or as the number of cracks increases, the pressure of water sent from the high-pressure pump 40 to the nozzle 26 decreases. Thus, it can be determined whether or not the nozzle 26 has damage based on the reduction in pressure detected by the pressure sensor 42. The present inventors have further discovered that there is a correlation between the pressure of the water supplied from the high-pressure pump 40 to the nozzle 26 and the length of the laminar flow layer. In the present disclosure, the "length of the laminar flow layer" may mean the length of the portion of the water column 34 where the streamline has a regular shape. Specifically, the length of the laminar flow layer decreases as the pressure of water decreases. Thus, the length of the laminar flow layer can be predicted based on the pressure detected by the pressure sensor 42.

The storage unit 52 can have, for example, a hard disk drive and/or RAM (random access memory). The storage unit 52 can store, for example, various program which are executed by a processor. The storage unit 52 is configured so as to store the pressure detected by the pressure sensor 42. Furthermore, the storage unit 52 stores the relationship between the pressure of the water supplied from the high-pressure pump 40 to the nozzle 26 and the length of the laminar flow layer of the water column 34. The relationship between the specific pressure and the length of the laminar flow layer can be obtained, for example, experimentally for each diameter of the nozzle holes 26b. The storage unit 52 may store other various data.

The display unit 53 can be, for example, a liquid crystal display or a touch panel. The display unit 53 can display a notification (which will be described in detail later) when the nozzle 26 has damage and when the workpiece W cannot be machined.

The controller 50 may be connected to a user smartphone 401 and/or tablet 402 of the laser processing machine 100 via a network N such as the Internet. The controller 50 may be configured so as to, for example, transmit a notification (which will be described in detail later) that the nozzle 26 has damage and/or that the machining has stopped via the network N. By adopting such a configuration, an operator can be quickly notified of problems.

Next, the operation of the water jet laser processing machine 100 will be described.

FIG. 2 is a flowchart showing the operation of the water jet laser processing machine of FIG. 1. The operations shown in FIG. 2 can be started when machining is started in accordance with a program stored in the storage unit 52. The operations shown in FIG. 2 may be started in accordance with an input from the operator, or may be started at a different timing. When the operations are started, the determination unit 51 clears the counter to n=0 (n=1, 2, 3 . . . ) (step S100). Next, the determination unit 51 stores the current pressure received from the pressure sensor 42 in the storage unit 52 as a threshold for determining a reduction in pressure (step S102). Next, the determination unit 51 determines whether or not machining has completed (step S104). When it is determined in step S104 that machining has completed, the series of operations ends.

When it is determined in step S104 that machining has not completed, the determination unit 51 determines whether or not the high-pressure pump 40 is defective (step S106). For example, the storage unit 52 may store in advance a predetermined lower limit pressure obtained experimentally, by analysis, etc., and in step S106, the determination unit 51 may determine whether or not the current pressure transmitted from the pressure sensor 42 is lower than the lower limit pressure stored in the storage unit 52. When the current pressure is lower than the lower limit pressure, the determination unit 51 may determine that the high-pressure pump 40 is defective, and when the current pressure is equal to or greater than the lower limit pressure, the determination unit 51 may determine that the high-pressure pump 40 is not defective. The determination in step S106 may be performed in accordance with another method.

When it is determined in step S106 that the high-pressure pump 40 is defective, the determination unit 51 notifies as such (step S124), stops the machining (step S122), and the series of operations ends. The notification may be, for example, a message displayed on the display unit 53 or may be issued by outputting a sound or warning from a speaker.

When it is determined in step S104 that the high-pressure pump is not defective, the determination unit 51 waits for a predetermined time (for example, at least one second)(step S108). Next, the determination unit 51 determines whether or not the current pressure received from the pressure sensor 42 is less than the threshold (the pressure at the time of step S102) stored in the storage unit 52 in step S102 (step S110).

When it is determined in step S110 that the current pressure is not less than the stored threshold, the determination unit 51 determines that the nozzle 26 is not damaged or that the damage has not progressed, and steps S100 to S110 are repeated until it is determined in step S104 that machining has ended.

When it is determined in step S110 that the current pressure is less than the stored threshold, the determination unit 51 determines whether or not the counter is within a predetermined range (for example, n 10) (step S112). When it is determined in step S112 that the counter is within the predetermined range, the determination unit 51 adds 1 to the counter n (step S114), and repeats steps S104 to S112.

When it is determined in step S112 that the counter is not within the predetermined range (i.e., when the pressure detected by the pressure sensor 42 falls below the threshold stored in the storage unit 52 for a predetermined time or longer), the determination unit 51 determines that the nozzle 26 is damaged, and notifies as such to the operator (step S116). The notification may be, for example, a message displayed on the display unit 53, or may be issued by outputting a sound or warning from a speaker.

Next, the determination unit 51 calculates the length of the laminar flow layer based on the current pressure received from the pressure sensor 42, and the relationship between the pressure stored in the storage unit 52 and the length of the laminar flow layer (step S118). Next, the determination unit 51 determines whether or not the calculated length of the laminar flow layer is longer than the intended machining depth (step S120).

When it is determined in step S120 that the length of the laminar flow layer is longer than the machining depth, the determination unit 51 determines that machining can proceed, and repeats steps S100 and SI 18 until it is determined in step S104 that the machining has ended.

When it is determined in step S120 that the length of the laminar flow layer is not longer than the machining depth, the determination unit 51 determines that the procession of machining is difficult, stops the machining (step S122), and the series of operations ends. The determination unit 51 may turn off, for example, the high-pressure pump 40 and the laser transmitter 14. Furthermore, the determination unit 51 may notify the operator that, for example, the machining has stopped. The notification may be, for example, a message displayed on the display unit 53 or may be issued by outputting a noise or warning from a speaker.

In the laser processing machine 100 according to the embodiment described above, by arranging a pressure sensor 42 between the high-pressure pump 40 and the nozzle 26 so as to detect the pressure of the water, a reduction in the pressure of the water supplied from the high-pressure pump 40 to the nozzle 26, i.e., damage of the nozzle 26, can be detected. Thus, whether or not the nozzle 26 has damage can easily be determined by a simple structure, represented by providing the pressure sensor 42 between the high-pressure pump 40 and the nozzle 26.

Furthermore, in the laser processing machine 100, the storage unit 52 stores the relationship between the pressure of the water supplied from the high-pressure pump 40 to the nozzle 26 and the length of the laminar flow layer of the water column 34, and when the determination unit 51 determines that the nozzle 26 has damage, the length of the laminar flow layer is calculated based on the pressure detected by the pressure sensor 42 and the relationship stored in the storage unit 52, and it is determined whether the length of the laminar flow layer is longer than the intended machining depth, whereby it can be determined whether or not the workpiece W can be machined. Thus, even when the nozzle 26 has damage, by calculating the length of the laminar flow layer, it can be determined whether or not the workpiece W can be machined using the damaged nozzle 26. Thus, the usage period of the nozzle 26 can be extended.

Furthermore, in the laser processing machine 100, the storage unit 52 stores the pressure detected by the pressure sensor 42 at a certain time point as a threshold, and the determination unit 51 determines that the pressure detected by the pressure sensor 42 has dropped when the pressure detected by the pressure sensor 42 after this time point falls below the above threshold for a predetermined time or longer. Thus, even when the pressure detected by the pressure sensor 42 fluctuates slightly, pressure drops can accurately be detected, whereby it can more accurately be determined whether or not the nozzle 26 has damage. This time point is the time when it is determined that the nozzle 26 is ready for machining, such as when the nozzle 26 has been replaced with a new nozzle or when it is confirmed that the length of the laminar flow layer of the water column 34 is longer than the intended machining depth.

Though the embodiments of the water jet laser processing machine have been described, the present invention is not limited to the embodiments described above. A person skilled in the art would understand that various modifications can be made to the embodiments described above. Furthermore, a person skilled in the art would understand that the steps executed by the controller 50 (or the determination unit 51) need not be performed in the order described above, and can be performed in another order as long as no contradictions are brought about thereby.

For example, in the embodiments described above, the storage unit 52 stores the pressure at a certain time point detected by the pressure sensor 42 as a threshold (step S102), and the determination unit 51 determines that the pressure has dropped when the pressure detected by the pressure sensor 42 thereafter falls below the threshold stored in step S102 for a predetermined time or longer. In another embodiment, for example, a predetermined threshold determined by, for example, experimentation or analysis may be stored in the storage unit 52 in advance, and the determination unit 51 may determine that the pressure has dropped when the pressure detected by the pressure sensor 42 falls below the stored threshold. In this case, for example, the predetermined threshold can be a value higher than the lower limit pressure used when determining defectiveness of the high-pressure pump 40.

REFERENCE SIGNS LIST 26 nozzle
34 water column
40 pump
42 pressure sensor
51 determination unit
52 storage unit
100 water jet laser processing machine
W workpiece

The invention claimed is:

1. A water jet laser processing machine which guides a laser beam with a water column and which machines a workpiece by irradiating the workpiece with the laser beam, the processing machine comprising:
    a nozzle for spraying the water column, the nozzle being configured so as to be capable of introducing the laser beam into the water column,
    a pump for supplying pressurized water to the nozzle,
    a pressure sensor for detecting pressure of water supplied from the pump to the nozzle,
    a storage unit configured to store a threshold for determining a decline in the pressure of the water supplied from the pump to the nozzle and a relationship between the pressure of the water supplied from the pump to the nozzle and a length of a laminar flow layer of the water column, and
    a determination unit configured to determine whether or not the pressure detected by the pressure sensor has declined based on the pressure detected by the pressure sensor and the threshold stored in the storage unit, to thereby determine whether or not the nozzle has damage,
    wherein the determination unit is configured to determine that the nozzle is damaged; and when the determination unit determines that the nozzle is damaged, the determination unit determines whether or not the workpiece can be machined by calculating the length of the laminar flow layer based on the pressure detected by the pressure sensor and the relationship stored in the storage unit, and determines whether or not the length of the laminar flow layer is greater than an intended machining depth.

2. The water jet laser processing machine according to claim 1, wherein the pressure detected by the pressure sensor at a certain time point is stored in the storage unit as the threshold, and the determination unit determines that the pressure detected by the pressure sensor has declined when the pressure detected by the pressure sensor after the certain time point falls below the threshold for a predetermined time or longer.

\* \* \* \* \*